(12) United States Patent
Brenner et al.

(10) Patent No.: US 8,115,091 B2
(45) Date of Patent: Feb. 14, 2012

(54) METHOD AND DEVICE FOR CONTROLLING VIBRATIONAL AND LIGHT EFFECTS USING INSTRUMENT DEFINITIONS IN AN AUDIO FILE FORMAT

(75) Inventors: David S. Brenner, Mundelein, IL (US); Conor P. O'Sullivan, Chicago, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1658 days.

(21) Appl. No.: 10/893,652

(22) Filed: Jul. 16, 2004

(65) Prior Publication Data

US 2006/0011042 A1    Jan. 19, 2006

(51) Int. Cl.
*G10H 7/00* (2006.01)
(52) U.S. Cl. .......................................... 84/645
(58) Field of Classification Search ...................... 84/645
See application file for complete search history.

(56) References Cited

U.S. PATENT DOCUMENTS

| | | | |
|---|---|---|---|
| 4,995,026 A | 2/1991 | Makabe et al. | |
| 5,986,201 A * | 11/1999 | Starr et al. | 84/645 |
| 6,395,969 B1 | 5/2002 | Fuhrer | |
| 6,417,439 B2 | 7/2002 | Uehara et al. | |
| 6,564,108 B1 | 5/2003 | Makar et al. | |
| 6,828,498 B2 * | 12/2004 | Sugiyama et al. | 84/645 |
| 6,889,947 B2 | 5/2005 | Alberts | |
| 2002/0038157 A1 | 3/2002 | Dowling et al. | |
| 2002/0061772 A1 | 5/2002 | Hayashi | |
| 2002/0078221 A1 | 6/2002 | Blackwell et al. | |
| 2002/0109708 A1 | 8/2002 | Peurach et al. | |
| 2003/0067440 A1 | 4/2003 | Rank | |
| 2003/0166405 A1 | 9/2003 | Jauk et al. | |
| 2004/0139842 A1 | 7/2004 | Brenner et al. | |

FOREIGN PATENT DOCUMENTS

CN    1131758 A    9/1996

OTHER PUBLICATIONS

Scalable Polyphony MIDI Device, 5-24 Note Profile for 3GPP, Version 1.0, May 24, 2002, 18 pages.
United States Patent and Trademark Office "Non-Final Rejection" for U.S. Appl. No. 10/346,409 dated Jul. 27, 2004, 5 pages.
Patent Office of the People's Republic of China, "Notification of the First Office Action" for CN Application No. 200380108933.2, dated Dec. 1, 2006, 8 pages.

* cited by examiner

*Primary Examiner* — Jeffrey Donels

(57) ABSTRACT

An audio file format is provided, which includes definitions for one or more instruments, and definitions for one or more notes, that are associated with one or more vibrational element groupings, where each vibrational element grouping includes one or more vibration sources. Received commands present in the audio file, and associated with a note and an instrument definition, are compared to determine if the associated note and instrument definitions correspond to one of the one or more vibrational element groupings. If the associated instrument definition corresponds to a vibrational element grouping, then the commands are mapped to corresponding vibrational effects, and the actuation of the one or more vibration sources of the respective vibrational element grouping is controlled. If the associated instrument definition of the received command corresponds to an audio instrument, then an audible output is controlled in accordance with the received command.

8 Claims, 3 Drawing Sheets

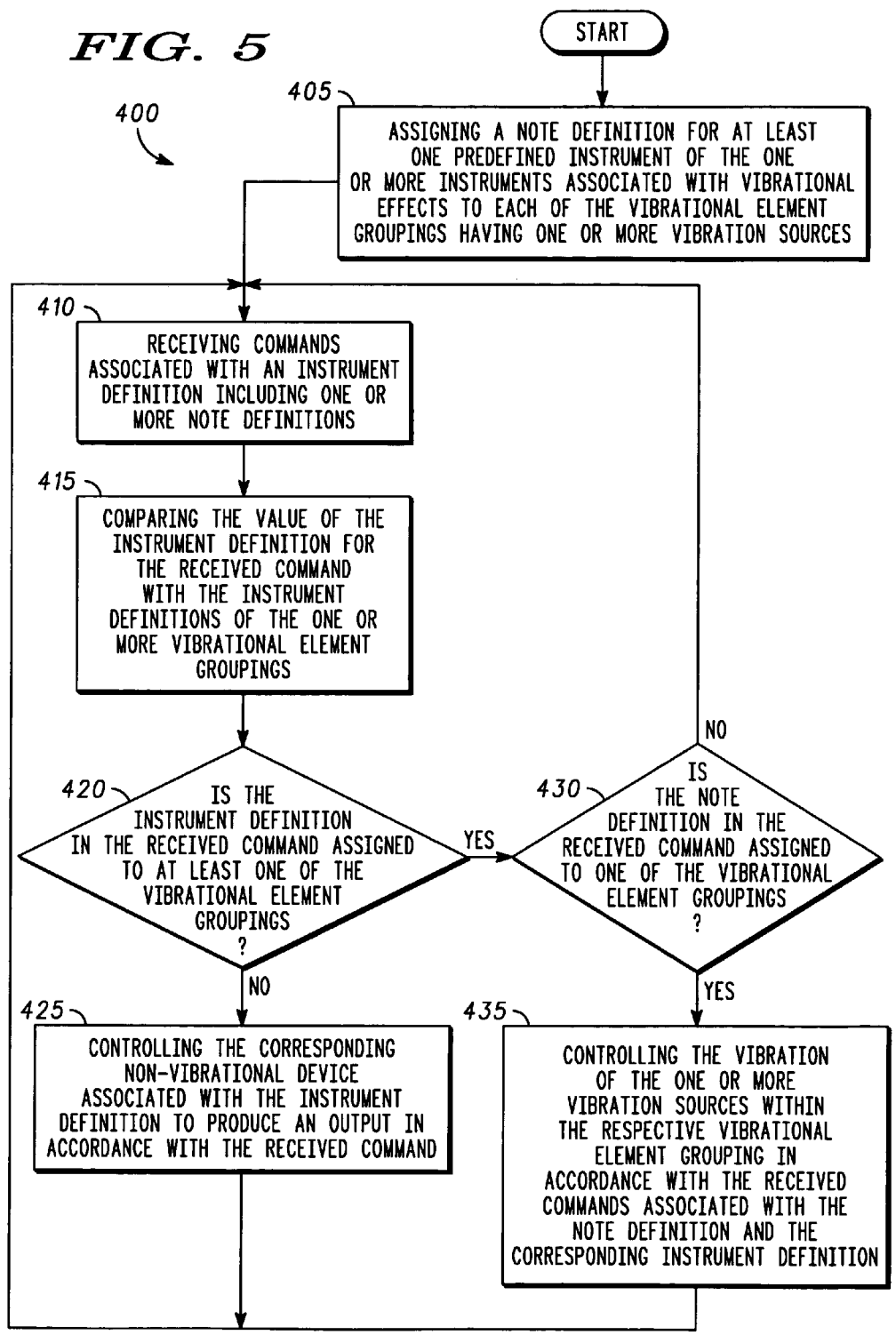

METHOD AND DEVICE FOR CONTROLLING VIBRATIONAL AND LIGHT EFFECTS USING INSTRUMENT DEFINITIONS IN AN AUDIO FILE FORMAT

FIELD OF THE INVENTION

The present invention relates generally to the implementation and control of vibrational effects and, more particularly, to the implementation and control of vibrational effects, that are synchronized with the playback of audio from an audio file, in an electronic device.

BACKGROUND OF THE INVENTION

Portable electronic devices, such as cellular telephones and personal digital assistants (PDA's) provide information to users through an increasing number of modalities, including graphical information displayed on display screens, sound played through speakers, and vibrations generated via vibratory components. Increasingly, there is a desire to extend the capabilities of the devices, so as to enable a more immersive experience.

Historically, vibrational feedback has been used as a substitute for an auditory alert. Such a form of alert has proved to be popular during sound sensitive occasions where an auditory alert would be generally disturbing to others. Furthermore, vibrational feedback has been historically used to provide a confirming tactile sensation, relative to the actuation of a user selection, generally involving a selection via physical contact, such as the depression of a key.

More recently, vibrational feedback has been used to supplement the conveyance of visual and/or auditory information. One such environment includes video games, where vibratory feedback can be conveyed to the user through the user's hands via a device, such as a controller. An effect associated with the game play, such as a crash could be accompanied by the visual presentation of sparks and/or an explosion; an audio presentation of a squeal of brakes, the popping of flames and/or the crunching of metal; and a general vibrational effect, which coincides with the crash.

Traditionally, relative to gaming, vibrational effects conveyed via a hand-held device have not been very specific, and have often involved a single source, such as a rotary mass vibrator, which was somewhat centrally located, and generally vibrated the entire device with a specific intensity for a specified duration.

At least one form of audio file format, known as the musical instrument digital interface (MIDI), allows for the control of a vibratory device via a predefined instrument designation, which is associated with the driver of a vibratory source. However, such an existing standard generally supports only a single common vibratory control.

Part of creating a more immersive experience relative to vibratory feedback involves more variably and more finely controlling the generation of the vibratory feedback so as to more closely mirror the effect that the device is intended to reproduce. A further part of creating a more immersive experience relative to vibratory feedback involves better synchronizing the vibrational effects with the other forms of output to be sensed by the user including other auditory and visual effects.

The present inventors have recognized that it would be desirable to be able to control multiple different groupings of vibrational sources, and to have greater flexibility in the generation of each of those vibrational effects. By mapping the vibrational effects to existing audio commands and allowing the separate control of multiple vibrational element groupings in an audio file format, more immersive vibrational effects, which are more readily synchronized with other effects can be created, which will enhance a user's overall usage experience.

SUMMARY OF THE INVENTION

The present invention provides an audio file format, which includes definitions for one or more instruments and definitions for one or more notes, which are associated with the one or more instruments. The audio file format additionally comprises one or more vibrational element groupings, where each vibrational element grouping includes one or more vibration sources and is associated with a corresponding one of the one or more note definitions for at least one predefined instrument of the one or more instrument definitions.

In at least a further embodiment, the audio file format conforms to the MIDI (musical instrument digital interface) specification, which includes MIDI system commands.

In a still further embodiment, the audio file format is at least one of received, stored, and played in an electronic device, like a cellular telephone, which has one or more vibrational element groupings. In yet a still further embodiment, the audio file format additionally supports the illumination of light sources in an electronic device, like a cellular telephone, which has one or more light groupings.

The present invention further provides a method for controlling vibrational effects for multiple vibrational element groupings using an audio file format. The method comprises assigning a note definition for at least one predefined instrument of the one or more instruments to each of one or more vibrational element groupings, which each have one or more vibration sources. Commands are then received for the note definitions for the at least one predefined instrument of the one or more instruments assigned to at least one of the one or more vibrational element groupings. The actuation of the one or more vibration sources within the corresponding vibrational element grouping is then controlled in accordance with the commands received, which include the assigned note for the at least one predefined instrument.

The present invention still further provides a portable electronic device, which includes one or more vibrational element groupings, each including one or more vibration sources, and a processor coupled to the plurality of vibrational element groupings. The processor includes an audio file interpreter module, which is adapted for interpreting the contents of a file in an audio file format including definitions for one or more instruments, and one or more note definitions, where each of the vibrational element groupings is associated with a corresponding one of the one or more note definitions for at least one predefined instrument of the one or more instrument definitions. The audio file interpreter module is further adapted to actuate the vibration sources within the vibrational element grouping, when a note for an instrument corresponding to one of the plurality of vibrational element groupings is received.

These and other features, and advantages of this invention are evident from the following description of one or more preferred embodiments of this invention, with reference to the accompanying drawings.

BRIEF DESCRIPTION OF THE DRAWINGS

FIG. 5 is a flow diagram of a method for controlling vibrational effects using an audio file format, in accordance with at least one embodiment of the present invention.

DETAILED DESCRIPTION OF THE PREFERRED EMBODIMENT(S)

Figure 1:
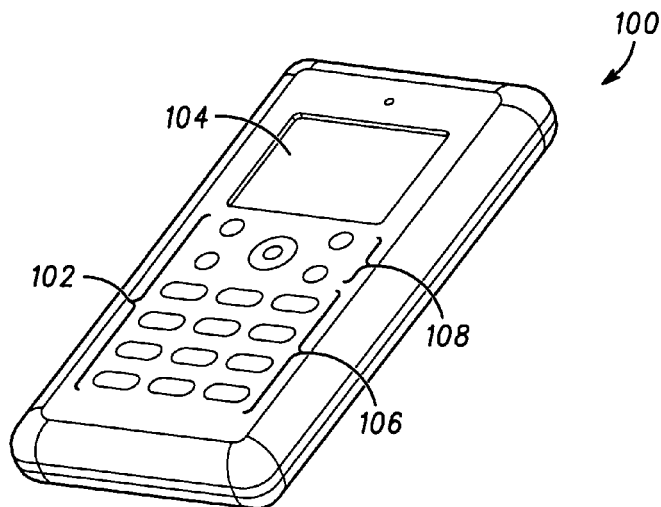
FIG. 1 is a perspective view of a hand held device, which includes one or more vibrational element groupings, in accordance with at least one embodiment of the present invention, within which an audio file format including vibrational controls can be used.

While the present invention is susceptible of embodiment in various forms, there is shown in the drawings and will hereinafter be described several embodiments with the understanding that the present disclosure is to be considered an exemplification of the invention and is not intended to limit the invention to the specific embodiments illustrated.

FIG. 1 illustrates a perspective view of a hand held device 100, which includes a set of vibrational element groupings, in accordance with at least one embodiment of the present invention, within which an audio file format including vibrational controls an be used. The hand held device 100 includes a keypad 102 having multiple keys, which can be selectively actuated, and a display 104 for visually presenting information to a user. In the illustrated embodiment, the keypad 102 includes both alphanumeric keys 106 and navigation keys 108.

Figure 2:
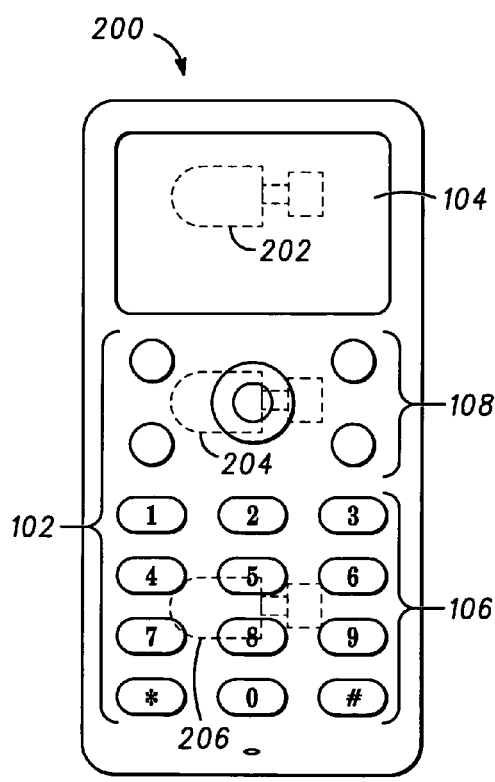
FIG. 2 is a plan view of a hand held device incorporating one or more vibrational element groupings, in accordance with at least one embodiment of the present invention.

FIG. 2 illustrates a plan view of a hand held device 200, which is the same or similar to the hand held device illustrated in FIG. 1. In addition to the keypad 102 and the display 104, the hand held device additionally includes a set of vibrational element groupings, in accordance with at least one embodiment of the present invention. In the present embodiment, the at least one set of vibrational element groupings includes a first grouping associated with a rotary mass vibrator 202, which is positioned behind the display 104. A second grouping includes a rotary mass vibrator 204, which is positioned behind the navigation keys 108. Lastly, a third grouping similarly includes a rotary mass vibrator 206. The rotary mass vibrator 206 of the third grouping is positioned behind the alphanumeric keys 106. By selectively actuating the various different vibrational element groupings, either separately or in combination, the various different vibrational element groupings can be controlled to produce varying vibrational effects.

In the embodiment illustrated in FIG. 2, the hand held device 200 generally includes rotary mass vibrators for producing the vibrational effects. The rotary mass vibrator can often include a motor, which is adapted to rotate a mass, that is unbalanced relative to the axis of rotation. While the vibrational element groupings associated with FIG. 2 is illustrated largely comprised of rotary mass vibrators, one skilled in the art will readily recognize that other elements which produce vibrational type effects could alternatively or additionally be used to provide various different types of tactile feedback to the user. Examples of additional different types of elements that can be alternatively or additionally used to produce vibrational type feedback effects include transducers, such as a multifunction transducer, and piezoelectric elements, such as a piezoelectric bender. One skilled in the art will generally recognize that other types of devices may similarly be suitable for producing vibrational type feedback, and correspondingly could be used in conjunction with the present invention to produce vibrational effects. In at least some instances, the various sources of vibrational effects will involve devices, which are capable of converting electrical energy into mechanical energy.

Furthermore, while the rotary mass vibrators are generally shown oriented in the same direction, additional variability can be produced by varying the facing and/or orientation of the rotary mass vibrator relative to the hand held device 200, as well as the direction of rotation. Still further variability can be produced by adjusting the overall number, size and/or location of the vibration sources, and/or the number, size and/or location of the vibration sources relative to a particular vibrational element grouping.

Figure 3:
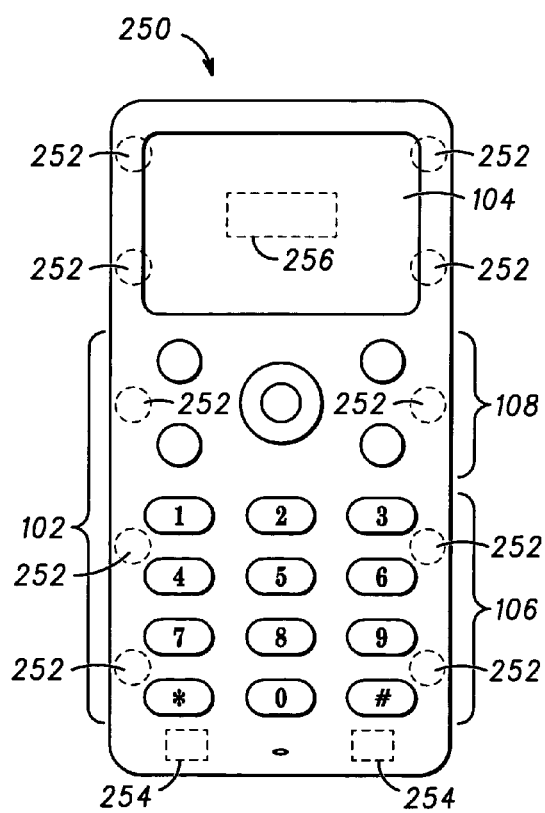
FIG. 3 is an alternative plan view of a hand held device incorporating one or more vibrational element groupings, in accordance with at least an alternative embodiment of the present invention.

FIG. 3 illustrates an alternative plan view of a hand held device 250 incorporating one or more vibrational element groupings, in accordance with at least an alternative embodiment of the present invention. Similar to the hand held device 200 illustrated in FIG. 2, the hand held device 250 illustrated in FIG. 3 includes a keypad 102, which includes both alphanumeric keys 106 and navigation keys 108, as well as a display 104. The hand held device 250 illustrated in FIG. 3 largely differs from the hand held device 200 illustrated in FIG. 2 in the number, type and positioning of vibration sources, which form the one or more vibrational element groupings. More specifically, hand held device 250 includes a plurality of rotary mass vibrators 252, which instead of being centered relative to the display screen 104, alphanumeric keys 106 and navigation keys 108, are sequentially vertically positioned along each side of the device 250. The hand held device 250 in the exemplary illustrated embodiment further includes a pair of multifunction transducers 254 located at opposite corners proximate the bottom of the device 250, which in addition to providing audio reproducing capabilities can additionally produce vibrational effects dependent upon the frequency being reproduced within the transducer. Still further the hand held device 250 includes a piezoelectric bender 256 positioned behind the display 104. Many types of piezoelectric benders 256 are known to be capable of producing a relatively sharp and abrupt force, which at least in part may be appropriate in producing a tactile feedback relative to a user selection via a touch sensitive display screen.

In the illustrated embodiment, each vibration source is generally separately identified as its own vibrational element grouping. However, it is similarly possible that various combinations of the vibration sources including the rotary mass vibrators 252, the multifunction transducers 254 and/or the piezoelectric bender 256 could be commonly assigned to the same vibrational element grouping. It is further possible that a particular vibration source could simultaneously be a member of multiple vibrational element groupings. By defining multiple vibrational element groupings, each group can be separately controlled. The specific order and/or sequence that the vibrational element groupings are activated can be defined in at least some instances by the user, and in other instances, they may be predefined or have default settings, which are determined by a software tool such as a visual composer. In other instances, they can be coordinated with audible sounds and/or lighting effects produced by the device, in a manner, which generally attempts to enhance the user's experience.

In accordance with at least one embodiment of the present invention, each of the vibrational element groupings is associated with a particular note corresponding to a predefined instrument definition in an audio format file, such as a MIDI (musical instrument digital interface) file format. One of the advantages of associating the vibrational element groupings with a standard musical file format is the enhanced ability to synchronize the vibrational effects with the audio playback of the audio data encoded in the musical file format, such as a MIDI file. A further advantage enables a vibration composer to make use of a library of well developed tools and feature definitions, which are already available for the development, and editing of MIDI format files.

In MIDI format files, the instrument definitions are also commonly referred to and/or are associated with patch numbers. The MIDI standard presently allows for 128 patch numbers per bank, and up to 16384 banks, which is defined by a most significant byte and a least significant byte each having a value between 0 and 127, where in essence the most significant bit in each byte is disregarded. In the illustrated embodiment, at least one instrument definition of a particular bank is associated with one or more vibrational element groupings. Each particular vibrational element grouping is associated with a specific note relative to the corresponding instrument definition.

The existing MIDI standard corresponding to Scalable Polyphony devices such as cellular telephones, which is also known as SP-MIDI, has provisions for optionally supporting a single vibrational device. The single vibrational device is mapped to bank number 79H 06H or 15494, when disregarding the most significant bit in each byte, and patch number/instrument definition 7CH or 125. The existing standard additionally presently supports the vibrational device as being either on or off, with generally all other information, such as a particular note, note volume, pitch bend, etc., being generally ignored.

In at least one embodiment, the present invention would similarly use bank number 15494 and instrument definition 125, but would additionally use a corresponding set of note definitions having a value ranging between 0 and 127 to identify a corresponding one of the vibrational element groupings. MIDI interpreters or play-back devices, which do not support vibrational elements, would generally ignore sound tracks defined for unknown bank numbers and/or instrument definitions. Consequently, the MIDI files with embedded vibrational controls would generally not interfere with devices incapable of producing vibrational effects, so long as the instrument definitions which are used for the vibrational effects are not otherwise used or defined.

By using the same bank number and instrument definition previously defined for vibrational effects, and using different note definitions to select between the different multiple vibrational element groupings, MIDI interpreters or play-back devices, that did not support the control of multiple vibrational element groupings, would still generally reproduce a vibrational effect with all of the effects being reproduced on the same single available vibrational source. In effect, this would allow some degree of backwards compatibility for MIDI files encoded to take advantage of the extended capabilities of multiple vibrational element groupings, even though the particular device upon which the MIDI file was being played did not support the extended capability. However one skilled in the art will appreciate that there is no requirement to use the same previously defined bank number and/or instrument definition used in connection with existing standards, and one could still benefit from the teachings of the present application.

Still further, it may be desirable to only encode some of the vibrational effects using the previously defined bank number and instrument definition, which would potentially allow for only partial playback of encoded vibrational effects, for devices which only supported a single vibrational source. In some cases, it may be desirable to use alternative or additional bank number and/or instrument definitions in conjunction with the presently allowed 128 note definitions to enable greater than 128 different controllable vibrational element groupings.

In addition to associating the vibrational element groupings with corresponding note definitions, other commands more commonly associated with audio functions, which with existing standards are generally ignored relative to producing vibrational effects, are mapped to other vibrational effects in conjunction with the present invention having extended capabilities. For example, in at least one embodiment volume is used to define and control the intensity of the force produced by the vibration sources within the vibrational element grouping.

Additionally, note velocity could be used to define and control the rate of ramp-up and ramp-down of vibrational intensity. A modulation could be defined to control the shape of a waveform (sine, square, triangle, etc.) that is superimposed on the volume/intensity level. Still further, pitch bend could be used to control the substantially continuous change of the signal strength used to drive the corresponding vibrational element grouping within a predefined range. As a final example, duration of a note, as well as the corresponding start and end times of each note, will define and control the start time and the end time of the activation of the vibration sources within the vibrational element groupings relative to a time reference.

While instruments definitions, in the MIDI file format, often have an ADSR (attack, decay, sustain and release), associated with it, in at least one of the embodiments of the present invention, this is largely not used. The activation of the vibrational source is generally on and off, as far as the instrument definition is concerned, and any corresponding effects are controlled by other audio type controls, several of which have been noted above. In other instances, it may be desirable to make extensive use of an ADSR, where the other corresponding effects are used to further modify the same.

To the extent that it may be desirable for the activation of the multiple vibrational element groupings to occur simultaneously and/or to overlap, such an effect could be reproduced by defining multiple notes which are reproduced during the same period of time. Such an effect could be similar to playing a chord.

As illustrated in connection with FIGS. 2 and 3, support for multiple vibrational element groupings can manifest in multiple different layouts with respect to the position of specific vibrational element groupings corresponding to a spatial position relative to the device within which they are incorporated. However, one or more standard vibrational element grouping layouts could similarly, be incorporated into the specification, in this way any given vibrational pattern data file would generally produce the same or similar results on a range of devices upon which it is intended to be played. Because MIDI can support the playback of multiple instruments simultaneously, both the playback of sounds and vibrational patterns can be simultaneously supported, as well as it may be possible to similarly support lighting effects, which may similarly be encoded. The control of lighting effects as part of an audio file format is described in copending U.S. patent application Ser. No. 10/346,409, filed Jan. 17, 2003, entitled "An Audio File Format with Mapped Lighting Effects and Method for Controlling Lighting Effects Using an Audio File Format", the specification of which is incorporated herein by reference.

A further advantage of using a well known already existing audio format, like MIDI format files, to incorporate vibrational control commands, is that many existing devices already accommodate the download, storage and/or playback/interpretation of the file type. For example, ring tones can be presently downloaded for many types of telephones from service providers and carriers in a MIDI file format.

Figure 4:
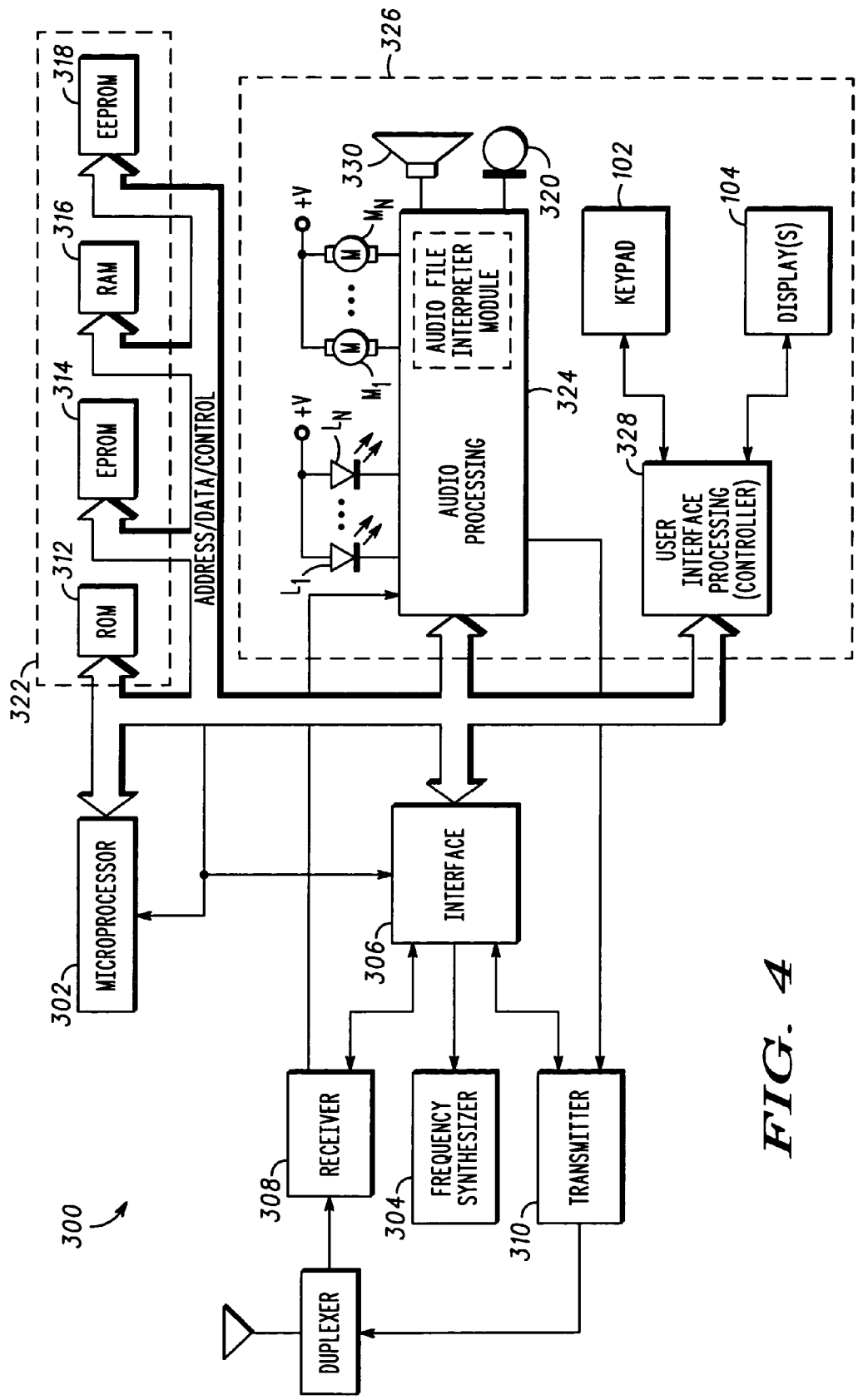
FIG. 4 is a block diagram of a wireless communication device, within which the audio file format of the present invention can be used to control vibrational effects.

In at least one embodiment, the present invention is incorporated within an electronic device, like a wireless communication device. FIG. 4 illustrates a block diagram of a wireless communication device 300, like a cellular telephone, within which the present invention can be incorporated. Generally, the wireless communication device communicates information via radio frequency signals. In the wireless communication device 300, the particular radio frequency is determined by the microprocessor 302. The particular radio frequency is conveyed to the frequency synthesizer 304 via the interface circuitry 306. Data signals received by the receiver 308 are decoded and coupled to the microprocessor 302 by the interface circuitry 306, and data signals to be transmitted by the transmitter 310 are generated by the microprocessor 302 and formatted by the interface circuitry 306 before being transmitted by the transmitter 310. Operational status of the transmitter 310 and the receiver 308 is enabled or disabled by the interface circuitry 306.

In at least one embodiment, the microprocessor 302, an audio processor 324, and a user interface processor 328 perform many of the processing functions under the control of program instructions stored in a memory section 322. Together, the microprocessor 302, the audio processor 324, and the user interface processor 328 can include one or more microprocessors, one or more of which may include a digital signal processor (DSP). The memory section 322 includes one or more forms of volatile and/or non-volatile memory including conventional read only memory (ROM) 312, erasable programmable read only memory (EPROM) 314, random access memory (RAM) 316, or electrically erasable programmable read only memory (EEPROM) 318. One skilled in the art will readily recognize that other types of memory are possible.

Identifying features of the wireless communication device are typically stored in EEPROM 318 (which may also be stored in the microprocessor in an on-board EEPROM, if available) and can include the number assignment (NAM) required for operation in a conventional cellular system and/or the base identification (BID) required for operation with a cordless base. Additionally stored in the memory section 322 are prestored instructions for handling the receipt, storage and processing of an audio format file, including audio format files that incorporate vibrational control commands, as well as the audio and possibly lighting control commands.

Control of user audio, the microphone 320 and the speakers, corresponding to a transducer 330, illustrated in FIG. 4, is controlled by the audio processor or audio processing circuitry 324, which forms part of a user interface circuit 326. The user interface circuit 326 additionally includes the user interface processor or user interface processing circuitry 328, which manages the operation of any keypad(s) 102 and/or display(s) 104. It is further envisioned that any keypad operation could be included as part of a touch sensitive display. In the illustrated embodiment at least some of the vibration sources M1-MN, associated with one or more vibrational element groupings, and lighting sources L1-LN, associated with the light groupings, are also controlled by the audio processing circuitry 324. However, in some embodiments the audio processing circuitry may transmit commands to other control elements, which more directly control the activation of the vibration sources and/or the illumination of the lighting sources. Still further an alternative processor could be used to execute a set of operating instructions associated with an audio file (e.g. MIDI) interpreter.

While the present invention has generally been described in association with a wireless communication device, like a cell phone, radiotelephone, or a cordless telephone, one skilled in the art will readily recognize that the invention is suitable for use with other types of devices. At least a couple of additional examples of other types of devices, where the use of the present invention would be suitable include paging devices, personal digital assistants, portable computers, pen-based or keyboard-based handheld devices, remote control units, an audio player (such as an MP3 player) and the like.

FIG. 5 illustrates a flow diagram of a method 400 for separately controlling vibrational effects using an audio file format. The method includes assigning 405 a note definition for at least one predefined instrument of the one or more instruments associated with vibrational effects to each one of one or more vibrational element groupings each having one or more vibration sources. Commands are then received 410 and/or executed from an audio file, which is in conformance with the audio file format, and is associated with an instrument definition (patch number) including one or more note definitions.

The value of the instrument definition for which the command was received is compared 415 with the instrument definitions associated with the one or more vibrational element groupings. A determination is then made 420, as to whether the instrument definition in the received command is assigned to a vibrational element grouping. If the instrument definition does not correspond to an instrument associated with a vibrational grouping, the command is used to control 425 the corresponding non-vibrational aspects of the device, such as producing a corresponding audio output, and returning to receive 410 and process further commands.

If the instrument definition corresponds to an instrument associated with at least one of the vibrational element groupings, then a further determination is made 430, as to whether the note definition in the received command is assigned to one of the vibrational element groupings. If the note definition does not correspond to at least one of the vibrational element groupings, the method returns to receive 410 further commands associated with the processing of the audio file, and process the same. If the note definition does correspond to at least one of the vibrational element groupings, the vibration of the one or more vibration sources within the respective vibrational element grouping is controlled 435, in accordance with the received commands associated with the note definition and the corresponding instrument definition.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:
1. A method for separately controlling vibrational effects for one or more vibrational element groupings using an audio file format comprising:
   assigning a note definition for at least one predefined instrument of the one or more instruments to each one of one or more vibrational element groupings having one or more vibration sources;

receiving commands for the note definitions for the at least one predefined instrument of the one or more instruments assigned to at least one of one or more vibrational element groupings; and actuating the one or more vibration sources within the corresponding vibrational element grouping in accordance with the commands received which include the assigned note for the at least one predefined instrument.

2. A method in accordance with claim 1 wherein receiving commands for the note definitions for the at least one predefined instrument of the one or more instruments additionally includes commands for receiving at least one of volume definitions, note velocity definitions and modulation definitions, associated with at least some of the one or more note definitions, and wherein actuating the one or more vibration sources additionally includes controlling the intensity of the force produced by the one or more vibration sources within the vibrational element grouping in accordance with the at least one of volume definitions, note velocity definitions and modulation definitions.

3. A method in accordance with claim 1 wherein the note definitions include relative start times and relative end times, which when associated with instrument definitions assigned to each of the one or more vibrational element groups affects the start time and the end time of the actuation of the vibration sources within the corresponding vibrational element groups.

4. A portable electronic device comprising:
one or more vibrational element groupings, each vibrational element grouping including one or more vibration sources; and
a processor coupled to the one or more vibrational element groupings, said processor including
an audio file interpreter module adapted for interpreting the contents of a file in an audio file format including definitions for one or more instruments, and one or more note definitions, which are associated with each of the one or more instruments, wherein each of the vibrational element groupings is associated with a corresponding one of the one or more note definitions for at least one predefined instrument of the one or more instrument definitions, and wherein when a note for an instrument corresponding to one of the one or more vibrational element groupings is received, the vibration sources within the vibrational element grouping is actuated.

5. A portable electronic device in accordance with claim 4 further comprising one or more speakers coupled to the processor, which is adapted for producing an audio output in response to the interpretation by the audio file interpreter of the one or more note definitions for one or more instrument definitions associated with producing an audio output.

6. A portable electronic device in accordance with claim 4 further comprising one or more light groupings, which each include one or more light sources; wherein each of the light groupings are associated with at least one of an instrument definition, and a note definition associated with one or more of the instrument definitions; and wherein the one or more light groupings are adapted to illuminate in response to the interpretation by the audio file interpreter of the at least one of the instrument definition, and the note definition associated with one of the one or more light groupings.

7. A portable electronic device in accordance with claim 4 further comprising a transceiver adapted for communicating with another electronic device.

8. A portable electronic device in accordance with claim 7 wherein said portable electronic device is a cellular telephone.

\* \* \* \* \*